(12) United States Patent
Yasuta et al.

(10) Patent No.: US 9,726,259 B1
(45) Date of Patent: Aug. 8, 2017

(54) PLANETARY GEAR TYPE TRANSMISSION

(71) Applicant: Komatsu Ltd., Tokyo (JP)

(72) Inventors: Nobuhito Yasuta, Hakusan (JP); Taku Matsuo, Komatsu (JP); Masaki Shiohara, Komatsu (JP); Yutaka Kamatani, Komatsu (JP); Kohei Izumi, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/117,767

(22) PCT Filed: Feb. 1, 2016

(86) PCT No.: PCT/JP2016/052886
§ 371 (c)(1),
(2) Date: Aug. 10, 2016

(87) PCT Pub. No.: WO2016/108294
PCT Pub. Date: Jul. 7, 2016

(51) Int. Cl.
*F16H 3/66* (2006.01)

(52) U.S. Cl.
CPC ....... *F16H 3/66* (2013.01); *F16H 2200/0065* (2013.01); *F16H 2200/0086* (2013.01); *F16H 2200/0095* (2013.01); *F16H 2200/2012* (2013.01); *F16H 2200/2046* (2013.01)

(58) Field of Classification Search
CPC ............... F16H 3/66; F16H 2200/0065; F16H 2200/0086; F16H 2200/2012; F16H 2200/2046; F16H 2200/0095
See application file for complete search history.

(56) References Cited

U.S. PATENT DOCUMENTS

| 8,480,533 | B2 | 7/2013 | Meyer et al. | |
|---|---|---|---|---|
| 2009/0305837 | A1 | 12/2009 | Hiraiwa | |
| 2010/0184554 | A1 | 7/2010 | Shiohara | |
| 2012/0149519 | A1 | 6/2012 | Meyer et al. | |
| 2013/0150201 | A1 | 6/2013 | Knox et al. | |
| 2014/0235398 | A1* | 8/2014 | Lippert | F16H 3/44 475/275 |
| 2015/0267780 | A1 | 9/2015 | Meyer et al. | |
| 2015/0267781 | A1 | 9/2015 | Meyer et al. | |

FOREIGN PATENT DOCUMENTS

| CN | 101868650 A | 10/2010 |
|---|---|---|
| CN | 105202132 A | 12/2015 |
| CN | 204985566 U | 1/2016 |

(Continued)

*Primary Examiner* — Terry Chau
(74) *Attorney, Agent, or Firm* — Drinker Biddle & Reath LLP (57) ABSTRACT

A first carrier rotates integrally with an input shaft. A third sun gear and a fourth sun gear rotate integrally with a first intermediate shaft. A third carrier rotates integrally with a second ring gear. A fourth carrier rotates integrally with a third ring gear, and outputs power. A first clutch couples a first ring gear and a second sun gear to the first intermediate shaft. A second clutch couples the first carrier to a second carrier. A third clutch couples the second carrier to the first intermediate shaft. A first brake brakes rotation of a first sun gear. A second brake brakes rotation of the second ring gear and the third carrier. A third brake brakes rotation of a fourth ring gear.

3 Claims, 8 Drawing Sheets

(56) References Cited

FOREIGN PATENT DOCUMENTS

| | | |
|---|---|---|
| DE | 10 2009 031 543 A1 | 1/2011 |
| JP | 2010-127325 A | 6/2010 |
| JP | 201-500455 A | 1/2014 |
| JP | 2014-035056 A | 2/2014 |
| JP | 2015-064042 A | 4/2015 |
| WO | WO-2012/078251 A1 | 6/2012 |

\* cited by examiner

| | REDUCTION GEAR RATIO | STEP RATIO | OVERALL STEP RATIO | CLUTCH | | | BRAKE | | |
|---|---|---|---|---|---|---|---|---|---|
| | | | | FIRST | SECOND | THIRD | FIRST | SECOND | THIRD |
| F1 | 6.98 | 1.58 | | | | × | × | | × |
| F2 | 4.43 | 1.35 | | | × | × | | | × |
| F3 | 3.29 | 1.20 | | × | | | × | | × |
| F4 | 2.75 | 1.20 | | × | × | | | | × |
| F5 | 2.29 | 1.47 | 9.40 | | × | | × | | × |
| F6 | 1.56 | 1.19 | | × | × | | × | | |
| F7 | 1.32 | 1.32 | | | × | × | × | | |
| F8 | 1.00 | 1.35 | | × | × | × | | | |
| F9 | 0.74 | – | | × | | × | × | | |
| R1 | –6.30 | 2.96 | | | × | | × | × | |
| R2 | –2.13 | – | | × | | | × | × | |
| ADDITIONAL/ALTERNATIVE SPEED POSITIONS | | | | | | | | | |
| R2' | –2.87 | – | | | × | × | | × | |
| R2" | –0.97 | – | | × | × | | | × | |

FIG.3

| | GEAR RATIO |
|---|---|
| FIRST PLANETARY | 2.88 |
| SECOND PLANETARY | 1.96 |
| THIRD PLANETARY | 2.87 |
| FOURTH PLANETARY | 3.43 |

PLANETARY GEAR TYPE TRANSMISSION

TECHNICAL FIELD

The present invention relates to planetary gear type transmissions.

BACKGROUND ART

Construction vehicles such as dump trucks are provided with a planetary gear type transmission having a plurality of planetary gear mechanisms. The planetary gear type transmission can implement a desired reduction gear ratio by using an appropriate combination of planetary gear mechanisms. A conventional planetary gear type transmission is disclosed, for example, in U.S. Pat. No. 8,480,533 (PTD 1).

CITATION LIST

Patent Document

PTD 1: U.S. Pat. No. 8,480,533

SUMMARY OF INVENTION

Technical Problem

For a planetary gear type transmission, it is desired to increase the number of speed positions for improved fuel efficiency and enhanced running performance, it is desired to reduce the number of components for weight and size reductions, it is desired to increase an overall step ratio for improved maximum traction force and improved maximum vehicle speed, and it is desired to reduce variation in step ratios for smooth switching between the speed positions.

An object of the present invention is to provide a planetary gear type transmission capable of realizing an increased number of speed positions, a reduced number of components, an increased overall step ratio, and a reduced variation in step ratios.

Solution to Problem

A planetary gear type transmission according to an aspect of the present invention includes an input shaft, a first intermediate shaft, a first planetary gear mechanism, a second planetary gear mechanism, a third planetary gear mechanism, a fourth planetary gear mechanism, a first clutch, a second clutch, a third clutch, a first brake, a second brake, and a third brake. The input shaft is configured to rotate around a rotation axis. The first intermediate shaft is configured to rotate around the rotation axis. The first planetary gear mechanism has a first sun gear, a first planetary gear, a first ring gear, and a first carrier. The first carrier is configured to rotate integrally with the input shaft. The second planetary gear mechanism has a second sun gear, a second planetary gear, a second ring gear, and a second carrier. The second sun gear is configured to rotate integrally with the first ring gear. The third planetary gear mechanism has a third sun gear, a third planetary gear, a third ring gear, and a third carrier. The third sun gear is configured to rotate integrally with the first intermediate shaft. The third carrier is configured to rotate integrally with the second ring gear. The fourth planetary gear mechanism has a fourth sun gear, a fourth planetary gear, a fourth ring gear, and a fourth carrier. The fourth sun gear is configured to rotate integrally with the first intermediate shaft. The fourth carrier is configured to rotate integrally with the third ring gear and to output power. The first clutch is configured to couple the first ring gear and the second sun gear to the first intermediate shaft. The second clutch is configured to couple the first carrier to the second carrier. The third clutch is configured to couple the second carrier to the first intermediate shaft. The first brake is configured to brake rotation of the first sun gear. The second brake is configured to brake rotation of the second ring gear and the third carrier. The third brake is configured to brake rotation of the fourth ring gear.

The planetary gear type transmission described above further includes an output shaft configured to rotate integrally with the fourth carrier.

In the planetary gear type transmission described above, the first planetary gear mechanism, the second planetary gear mechanism, the third planetary gear mechanism, and the fourth planetary gear mechanism are disposed in this order along a direction of rotation axis.

Advantageous Effects of Invention

According to the planetary gear type transmission of the present invention, an increased number of speed positions, a reduced number of components, an increased overall step ratio, and a reduced variation in step ratios can be realized.

DESCRIPTION OF EMBODIMENTS

Embodiments of a planetary gear type transmission according to the present invention will be described below with reference to the drawings. In the following description, a direction of rotation axis refers to a direction in which the rotation axis extends. A radial direction of rotation axis refers to a radial direction of the circle centered around the rotation axis. Specifically, the direction of rotation axis is a horizontal direction of FIG. 1, and the radial direction is a vertical direction of FIG. 1. The rotation axis refers to a center line of an input shaft. An input side refers to the side of the planetary gear type transmission that receives power. An output side refers to the side of the planetary gear type transmission that outputs power. Specifically, the input side is the left side of FIG. 1, and the output side is the right side of FIG. 1.

Figure 1:
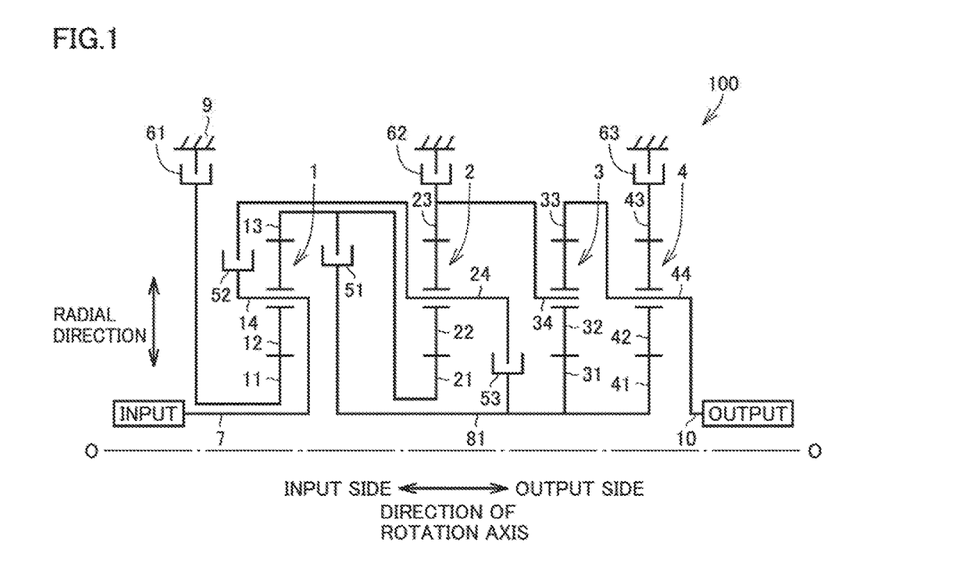
FIG. 1 is a schematic diagram of a planetary gear type transmission according to one embodiment.

FIG. 1 is a schematic diagram of a planetary gear type transmission according to one embodiment. A planetary gear type transmission 100 changes a rotational speed of power from an engine (not shown) or the like, and outputs the power. The power from the engine or the like may be input to planetary gear type transmission 100 via a torque converter.

Planetary gear type transmission 100 includes a plurality of planetary gear mechanisms 1 to 4, a plurality of clutches 51 to 53, a plurality of brakes 61 to 63, an input shaft 7, a first intermediate shaft 81, and a casing 9. Casing 9 contains each of planetary gear mechanisms 1 to 4, each of clutches 51 to 53, each of brakes 61 to 63, input shaft 7, and first intermediate shaft 81.

Planetary gear type transmission 100 includes, as a plurality of planetary gear mechanisms, first planetary gear mechanism 1, second planetary gear mechanism 2, third planetary gear mechanism 3, and fourth planetary gear mechanism 4. Planetary gear type transmission 100 includes, as a plurality of clutches, first clutch 51, second clutch 52, and third clutch 53. Planetary gear type transmission 100 includes, as a plurality of brakes, first brake 61, second brake 62, and third brake 63.

First planetary gear mechanism 1, second planetary gear mechanism 2, third planetary gear mechanism 3, and fourth planetary gear mechanism 4 are disposed in this order along the direction of rotation axis. More specifically, they are disposed in the order of first planetary gear mechanism 1, second planetary gear mechanism 2, third planetary gear mechanism 3, and fourth planetary gear mechanism 4 from the input side toward the output side.

Input shaft 7 is configured to rotate around a rotation axis O. Rotation axis O is a center line of input shaft 7. Power from the engine or the like is input to input shaft 7.

First intermediate shaft 81 is configured to rotate around rotation axis O. First intermediate shaft 81 extends in the direction of rotation axis. A central axis of first intermediate shaft 81 and a central axis of input shaft 7 are substantially the same.

First planetary gear mechanism 1 has a first sun gear 11, a plurality of first planetary gears 12, a first ring gear 13, and a first carrier 14.

First sun gear 11 is rotatably disposed around rotation axis O. First sun gear 11 is disposed outside of input shaft 7 in the radial direction. More specifically, first sun gear 11 is tubular, with input shaft 7 penetrating, through first sun gear 11. First sun gear 11 and input shaft 7 can rotate relative to each other.

Each first planetary gear 12 is configured to mesh with first sun gear 11. Each first planetary gear 12 is disposed outside of first sun gear 11 in the radial direction. More specifically, first planetary gears 12 are disposed at a distance from each other in a circumferential direction.

Each first planetary gear 12 is configured to revolve around first sun gear 11. Each first planetary gear 12 is configured to rotate around rotation axis O. In addition, each first planetary gear 12 is configured to rotate about its axis.

First ring gear 13 meshes with each first planetary gear 12. First ring gear 13 is configured to rotate around rotation axis O.

First carrier 14 supports each first planetary gear 12. Each first planetary gear 12 can rotate about its axis while being supported by first carrier 14. First carrier 14 is configured to rotate around rotation axis O.

First carrier 14 is configured to rotate integrally with input shaft 7. More specifically, first carrier 14 is fixed to input shaft 7. First carrier 14 and input shaft 7 may be formed of a single member.

Second planetary gear mechanism 2 has a second sun gear 21, a plurality of second planetary gears 22, a second ring gear 23, and a second carrier 24.

Second sun gear 21 is configured to rotate around rotation axis O. Second sun gear 21 is disposed outside of first intermediate shaft 81 in the radial direction. More specifically, second sun gear 21 is annular, with first intermediate shaft 81 penetrating through second sun gear 21. Second sun gear 21 and first intermediate shaft 81 can rotate relative to each other.

Second sun gear 21 is configured to rotate integrally with first ring gear 13. More specifically, second sun gear 21 is coupled to first ring gear 13. Second sun gear 21 and first ring gear 13 may be formed of a single member.

Each second planetary gear 22 is configured to mesh with second sun gear 21. Each second planetary gear 22 is disposed outside of second sun gear 21 in the radial direction. More specifically, second planetary gears 22 are disposed at a distance from each other in the circumferential direction.

Each second planetary gear 22 is configured to revolve around second sun gear 21. Each second planetary gear 22 is configured to rotate around rotation axis O. In addition, each second planetary gear 22 is configured to rotate about its axis.

Second ring gear 23 meshes with each second planetary gear 22. Second ring gear 23 is configured to rotate around rotation axis O.

Second carrier 24 supports each second planetary gear 22. Each second planetary gear 22 can rotate about its axis while being supported by second carrier 24. Second carrier 24 is configured to rotate around rotation axis O.

Third planetary gear mechanism 3 has a third sun gear 31, a plurality of third planetary gears 32, a third ring gear 33, and a third carrier 34.

Third sun gear 31 is configured to rotate integrally with first intermediate shaft 81. More specifically, third sun gear 31 is fixed to first intermediate shaft 81. Third sun gear 31 and first intermediate shaft 81 may be formed of a single member.

Each third planetary gear 32 is configured to mesh with third sun gear 31. Each third planetary gear 32 is disposed outside of third sun gear 31 in the radial direction. More specifically, third planetary gears 32 are disposed at a distance from each other in the circumferential direction.

Each third planetary gear 32 is configured to revolve around third sun gear 31. Each third planetary gear 32 is configured to rotate around rotation axis O. In addition, each third planetary gear 32 is configured to rotate about its axis.

Third ring gear 33 meshes with each third planetary gear 32. Third ring gear 33 is configured to rotate around rotation axis O.

Third carrier 34 supports each third planetary gear 32. Each third planetary gear 32 can rotate about its axis while being supported by third carrier 34. Third carrier 34 is configured to rotate around rotation axis O.

Third carrier 34 is configured to rotate integrally with second ring gear 23. More specifically, third carrier 34 is coupled to second ring gear 23. Third carrier 34 and second ring gear 23 may be formed of a single member.

Fourth planetary gear mechanism 4 has a fourth sun gear 41, a plurality of fourth planetary gears 42, a fourth ring gear 43, and a fourth carrier 44.

Fourth sun gear 41 is configured to rotate integrally with first intermediate shaft 81. More specifically, fourth sun gear 41 is fixed to first intermediate shaft 81. First intermediate shaft 81, and third sun gear 31 and fourth sun gear 41 are configured to rotate integrally with one another. Fourth sun gear 41 and first intermediate shaft 81 may be formed of a single member. Third sun gear 31 and fourth sun gear 41 may be formed of a single member.

Each fourth planetary gear 42 is configured to mesh with fourth sun gear 41. Each fourth planetary gear 42 is disposed outside of fourth sun gear 41 in the radial direction. More specifically, fourth planetary gears 42 are disposed at a distance from each other in the circumferential direction.

Each fourth planetary gear 42 is configured to revolve around fourth sun gear 41. Each fourth planetary gear 42 is configured to rotate around rotation axis O. In addition, each fourth planetary gear 42 is configured to rotate about its axis.

Fourth ring gear 43 meshes with each fourth planetary gear 42. Fourth ring gear 43 is configured to rotate around rotation axis O.

Fourth carrier 44 supports each fourth planetary gear 42. Each fourth planetary gear 42 can rotate about its axis while being supported by fourth carrier 44. Fourth carrier 44 is configured to rotate around rotation axis O.

Fourth carrier 44 is configured to rotate integrally with third ring gear 33. More specifically, fourth carrier 44 is coupled to third ring gear 33. Fourth carrier 44 and third ring gear 33 may be formed of a single member.

Fourth carrier 44 outputs power. More specifically, fourth carrier 44 outputs power having a rotational speed changed by planetary gear type transmission 100. Fourth carrier 44 rotates integrally with an output shaft 10. Thus, output shaft 10 outputs power with a changed speed. Fourth carrier 44 and output shaft 10 may be formed of a single member.

First clutch 51 is configured to couple first ring gear 13 and second sun gear 21 to first intermediate shaft 81. More specifically, first clutch 51 couples first ring gear 13 and second sun gear 21 to first intermediate shaft 81 in a disconnectable manner. First clutch 51 is a hydraulic clutch mechanism, for example, and can be formed of a plurality of discs.

When first clutch 51 is on, first clutch 51 couples first ring gear 13 and second sun gear 21 to first intermediate shaft 81. Accordingly, first ring gear 13, second sun gear 21 and first intermediate shaft 81 rotate integrally with one another.

When first clutch 51 is off, first clutch 51 disconnects the coupling between first ring gear 13 and second sun gear 21, and first intermediate shaft 81. Accordingly, first ring gear 13 and second sun gear 21 can rotate relative to first intermediate shaft 81.

Second clutch 52 is configured to couple first carrier 14 to second carrier 24. More specifically, second clutch 52 couples first carrier 14 to second carrier 24 in a disconnectable manner. Second clutch 52 is a hydraulic clutch mechanism, for example, and can be formed of a plurality of discs.

When second clutch 52 is on, second clutch 52 couples first carrier 14 to second carrier 24. Accordingly, first carrier 14 and second carrier 24 rotate integrally with each other.

When second clutch 52 is off, second clutch 52 disconnects the coupling between first carrier 14 and second carrier 24. Accordingly, second carrier 24 can rotate relative to first carrier 14.

Third clutch 53 is configured to couple second carrier 24 to first intermediate shaft 81. More specifically, third clutch 53 couples second carrier 24 to first intermediate shaft 81 in a disconnectable manner. Third clutch 53 is a hydraulic clutch mechanism, for example, and can be formed of a plurality of discs.

When third clutch 53 is on, third clutch 53 couples second carrier 24 to first intermediate shaft 81. Accordingly, second carrier 24 and first intermediate shaft 81 rotate integrally with each other.

When third clutch 53 is off, third clutch 53 disconnects the coupling between second carrier 24 and first intermediate shaft 81. Accordingly, second carrier 24 can rotate relative to first intermediate shaft 81.

First brake 61 is configured to brake rotation of first sun gear 11. More specifically, first brake 61 is configured to couple first sun gear 11 to casing 9.

When first brake 61 is on, first brake 61 brakes rotation of first sun gear 11. More specifically, when first brake 61 is on, first brake 61 couples first sun gear 11 to casing 9. Accordingly, first sun gear 11 is not rotatable.

When first brake 61 is off, first brake 61 does not brake rotation of first sun gear 11. More specifically, when first brake 61 is off, first brake 61 does not couple first sun gear 11 to casing 9. Accordingly, first sun gear 11 is rotatable.

Second brake 62 is configured to brake rotation of second ring gear 23 and third carrier 34. More specifically, second brake 62 is configured to couple second ring gear 23 and third carrier 34 to casing 9.

When second brake 62 is on, second brake 62 brakes rotation of second ring gear 23 and third carrier 34. More specifically, when second brake 62 is on, second brake 62 couples second ring gear 23 and third carrier 34 to casing 9. Accordingly, second ring gear 23 and third carrier 34 are not rotatable.

When second brake 62 is off, second brake 62 does not brake rotation of second ring gear 23 and third carrier 34. More specifically, when second brake 62 is off, second brake 62 does not couple second ring gear 23 and third carrier 34 to casing 9. Accordingly, second ring gear 23 and third carrier 34 are rotatable.

Third brake 63 is configured to brake rotation of fourth ring gear 43. More specifically, third brake 63 is configured to couple fourth ring gear 43 to casing 9.

When third brake 63 is on, third brake 63 brakes rotation of fourth ring gear 43. More specifically, when third brake 63 is on, third brake 63 couples fourth ring gear 43 to casing 9. Accordingly, fourth ring gear 43 is not rotatable.

When third brake 63 is off, third brake 63 does not brake rotation of fourth ring gear 43. More specifically, when third brake 63 is off, third brake 63 does not couple fourth ring gear 43 to casing 9. Accordingly, fourth ring gear 43 is rotatable.

Figure 2:
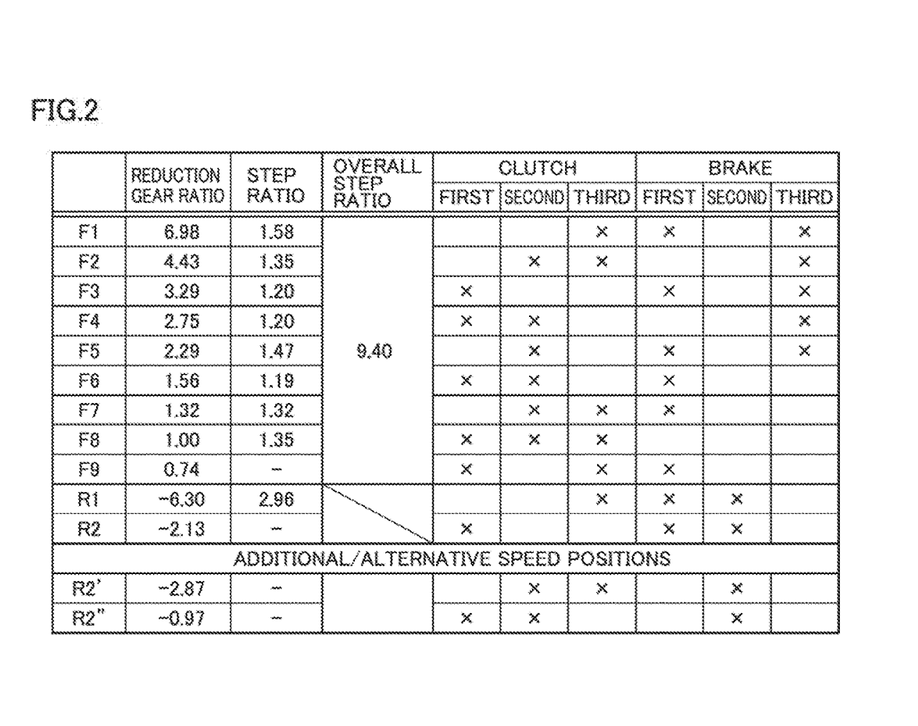
FIG. 2 is a table showing clutches or brakes which are turned on at each speed position of the planetary gear type transmission according to one embodiment.

The operation of planetary gear type transmission 100 thus configured is described. Planetary gear type transmission 100 has nine forward speed positions and two reverse speed positions. Planetary gear type transmission 100 has two alternative speed positions to the second reverse speed position. FIG. 2 is a table showing clutches or brakes which are turned on at each speed position. The cross in FIG. 2 indicates a clutch or brake which is turned on.

As shown in FIG. 2, when the speed position of planetary gear type transmission 100 is set to the first forward speed (F1), third clutch 53 is turned on, and first brake 61 and third brake 63 are turned on. First clutch 51, second clutch 52 and second brake 62 are off.

Since third clutch 53 is turned on, second carrier 24 rotates integrally with first intermediate shaft 81. Since first brake 61 is turned on, first sun gear 11 is rendered unrotatable. Since third brake 63 is turned on, fourth ring gear 43 is rendered unrotatable.

Figure 4:
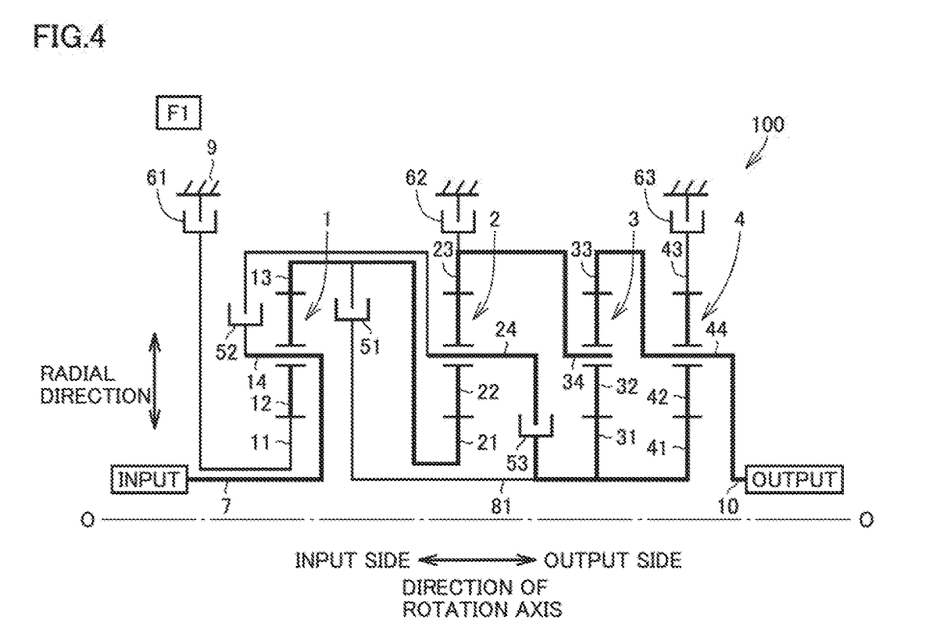
FIG. 4 is a diagram showing transmission of power when the planetary gear type transmission according to one embodiment is in the first forward speed position.

In this state, planetary gear type transmission 100 transmits power through a path such as indicated by a thick line in FIG. 4. First, first carrier 14 rotates integrally with input shaft 7. First sun gear 11 is not rotatable. The rotation of first carrier 14 causes each first planetary gear 12 to revolve while rotating about its axis. Then, first ring gear 13 rotates.

Second sun gear 21 rotates integrally with first ring gear 13. The rotation of second sun gear 21 causes each second planetary gear 22 to revolve while rotating about its axis. Second ring gear 23 rotates. Second carrier 24 rotates. First intermediate shaft 81 rotates integrally with second carrier 24.

Third carrier 34 rotates integrally with second ring gear 23. Third sun gear 31 rotates integrally with first intermediate shaft 81. Each third planetary gear 32 revolves while rotating about its axis. Third ring gear 33 rotates.

Fourth sun gear 41 rotates integrally with first intermediate shaft 81. Fourth ring gear 43 is not rotatable. The rotation of fourth sun gear 41 causes each fourth planetary gear 42 to revolve while rotating about its axis. As a result, fourth carrier 44 rotates integrally with third ring gear 33, and fourth carrier 44 outputs power having a changed rotational speed.

As shown in FIG. 2, when the speed position of planetary gear type transmission 100 is set to the second forward speed (F2), second clutch 52 and third clutch 53 are turned on, and third brake 63 is turned on. During the switching between the first speed (F1) and the second speed (F2), third clutch 53 and third brake 63 remain on. First clutch 51, first brake 61 and second brake 62 are off.

Since second clutch 52 is turned on, first carrier 14 rotates integrally with second carrier 24. Since third clutch 53 is turned on, first intermediate shaft 81 rotates integrally with second carrier 24. Since third brake 63 is turned on, fourth ring gear 43 is rendered unrotatable.

Figure 5:
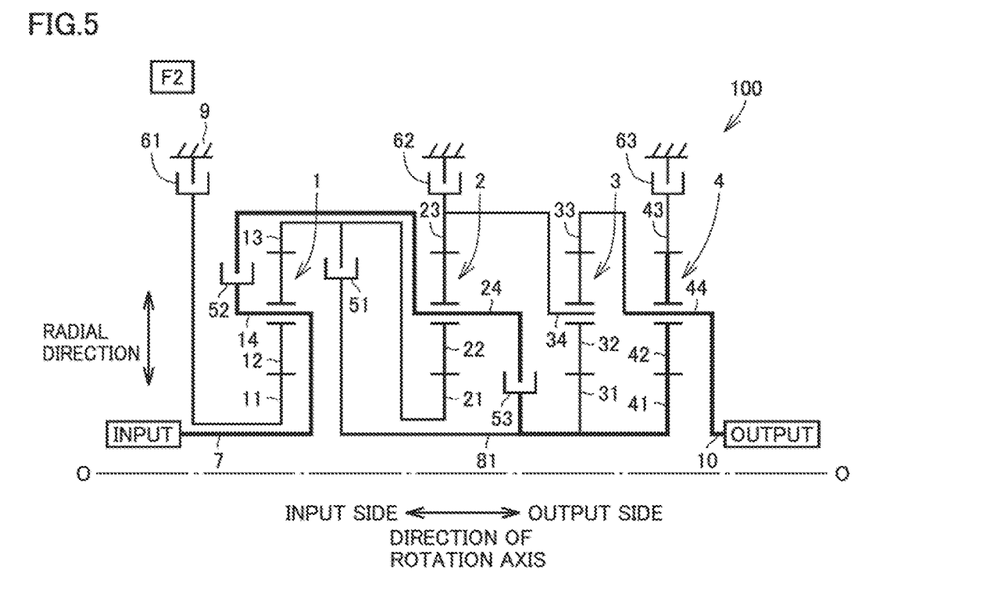
FIG. 5 is a diagram showing transmission of power when the planetary gear type transmission according to one embodiment is in the second forward speed position.

In this state, planetary gear type transmission 100 transmits power through a path such as indicated by a thick line in FIG. 5. First, first carrier 14 rotates integrally with input shaft 7. Second carrier 24 rotates integrally with first carrier 14. First intermediate shaft 81 rotates integrally with second carrier 24.

Fourth sun gear 41 rotates integrally with first intermediate shaft 81. Fourth ring gear 43 is not rotatable. The rotation of fourth sun gear 41 causes each fourth planetary gear 42 to revolve while rotating about its axis. As a result, fourth carrier 44 rotates, and fourth carrier 44 outputs power having a changed rotational speed.

As shown in FIG. 2, when the speed position of planetary gear type transmission 100 is set to the third forward speed (F3), first clutch 51 is turned on, and first brake 61 and third brake 63 are turned on. During the switching between the second speed (F2) and the third speed (F3), third brake 63 remains on. Second clutch 52, third clutch 53 and second brake 62 are off.

Since first clutch 51 is turned on, first ring gear 13 and second sun gear 21 rotate integrally with first intermediate shaft 81. Thus, first ring gear 13, second sun gear 21, third sun gear 31 and fourth sun gear 41 rotate integrally with one another. Since first brake 61 is turned on, first sun gear 11 is rendered unrotatable. Since third brake 63 is turned on, fourth ring gear 43 is rendered unrotatable.

Figure 6:
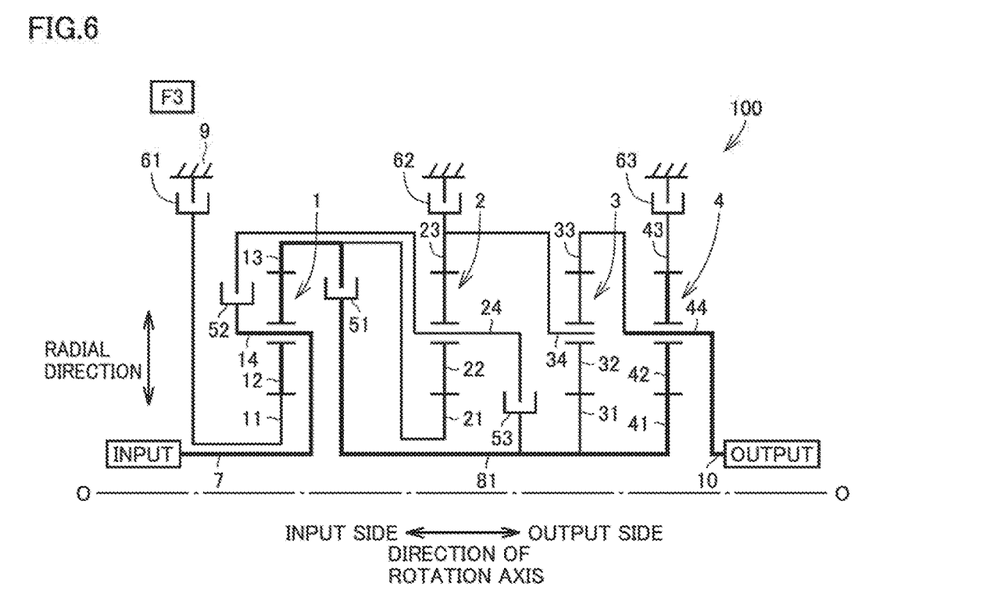
FIG. 6 is a diagram showing transmission of power when the planetary gear type transmission according to one embodiment is in the third forward speed position.

In this state, planetary gear type transmission 100 transmits power through a path such as indicated by a thick line in FIG. 6. First, first carrier 14 rotates integrally with input shaft 7. The rotation of first carrier 14 causes each first planetary gear 12 to revolve while rotating about its axis. First ring gear 13 rotates. First intermediate shaft 81 rotates integrally with first ring gear 13.

Fourth sun gear 41 rotates integrally with first intermediate shaft 81. Fourth ring gear 43 is not rotatable. The rotation of fourth sun gear 41 causes each fourth planetary gear 42 to revolve while rotating about its axis. As a result, fourth carrier 44 rotates, and fourth carrier 44 outputs power having a changed rotational speed.

As shown in FIG. 2, when the speed position of planetary gear type transmission 100 is set to the fourth forward speed (F4), first clutch 51 and second clutch 52 are turned on, and third brake 63 is turned on. During the switching between the third speed (F3) and the fourth speed (F4), first clutch 51 and third brake 63 remain on. Third clutch 53, first brake 61 and second brake 62 are off.

Since first clutch 51 is turned on, first ring gear 13, second sun gear 21, third sun gear 31 and fourth sun gear 41 rotate integrally with one another. Since second clutch 52 is turned on, first carrier 14 rotates integrally with second carrier 24. Since third brake 63 is turned on, fourth ring gear 43 is rendered unrotatable.

Figure 7:
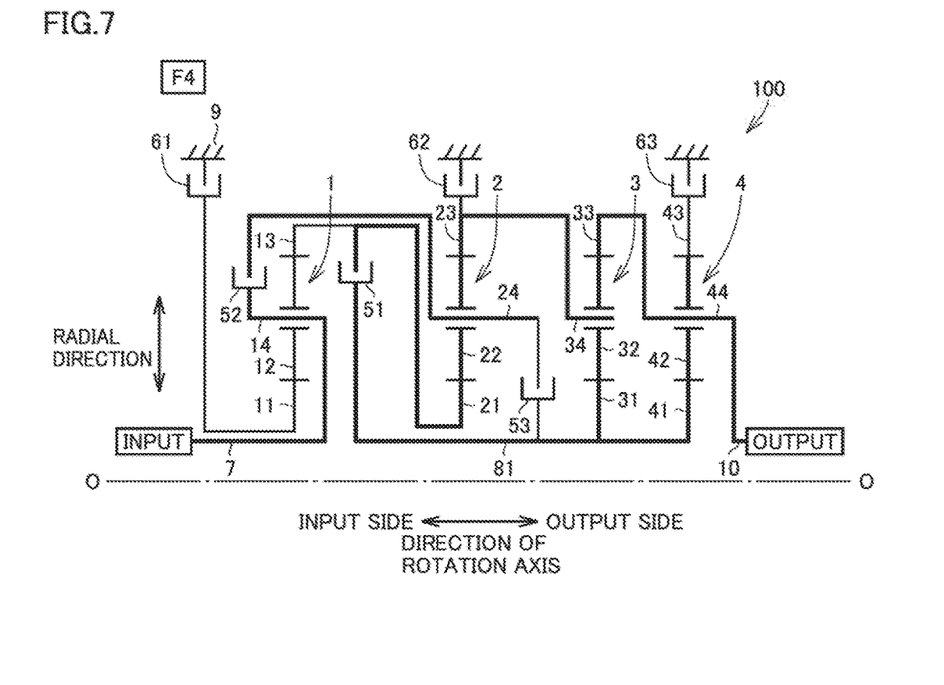
FIG. 7 is a diagram showing transmission of power when the planetary gear type transmission according to one embodiment is in the fourth forward speed position.

In this state, planetary gear type transmission 100 transmits power through a path such as indicated by a thick line in FIG. 7. First, first carrier 14 rotates integrally with input shaft 7. Second carrier 24 rotates integrally with first carrier 14. Each second planetary gear 22 revolves while rotating about its axis. Second sun gear 21 rotates. Second ring gear 23 rotates.

First intermediate shaft 81 rotates integrally with second sun gear 21. Thus, third sun gear 31 rotates integrally with second sun gear 21. Third carrier 34 rotates integrally with second ring gear 23. The rotation of third sun gear 31 and third carrier 34 causes each third planetary gear 32 to revolve while rotating about its axis. Third ring gear 33 rotates.

Fourth sun gear 41 rotates integrally with second sun gear 21. Fourth ring gear 43 is not rotatable. The rotation of fourth sun gear 41 causes each fourth planetary gear 42 to revolve while rotating about its axis. As a result, fourth carrier 44 rotates integrally with third ring gear 33, and fourth carrier 44 outputs power having a changed rotational speed.

As shown in FIG. 2, when the speed position of planetary gear type transmission 100 is set to the fifth forward speed (F5), second clutch 52 is turned on, and first brake 61 and third brake 63 are turned on. During the switching between the fourth speed (F4) and the fifth speed (F5), second clutch 52 and third brake 63 remain on. First clutch 51, third clutch 53 and second brake 62 are off.

Since second clutch 52 is turned on, first carrier 14 rotates integrally with second carrier 24. Since first brake 61 is turned on, first sun gear 11 is rendered unrotatable. Since third brake 63 is turned on, fourth ring gear 43 is rendered unrotatable.

Figure 8:
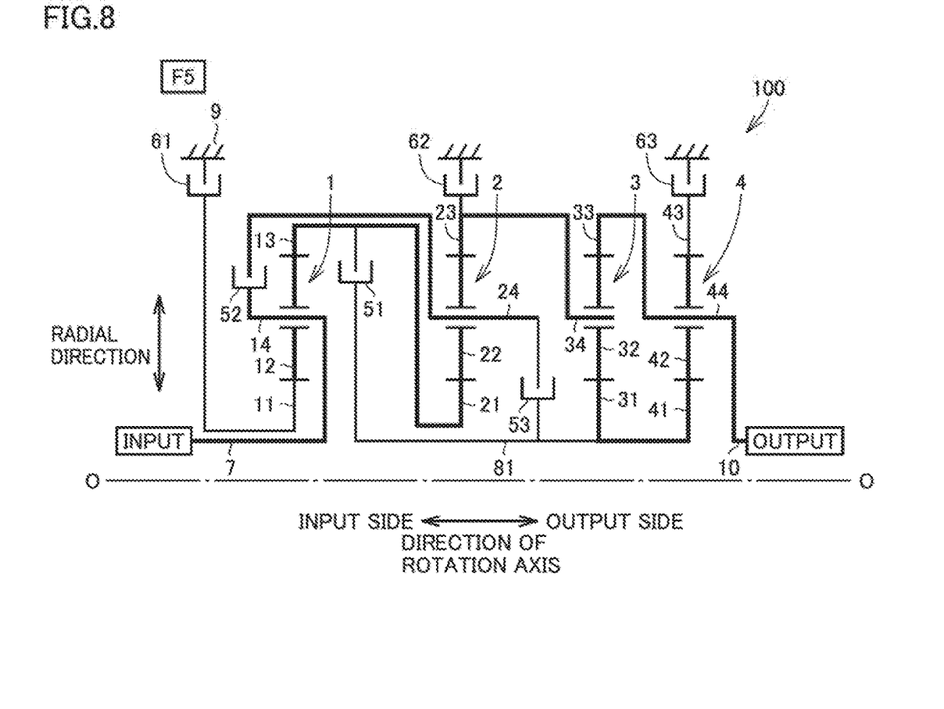
FIG. 8 is a diagram showing transmission of power when the planetary gear type transmission according to one embodiment is in the fifth forward speed position.

In this state, planetary gear type transmission 100 transmits power through a path such as indicated by a thick line in FIG. 8. First, first carrier 14 rotates integrally with input shaft 7. Each first planetary gear 12 revolves while rotating about its axis. First ring gear 13 rotates.

Second sun gear 21 rotates integrally with first ring gear 13. Second carrier 24 rotates integrally with first carrier 14. Each second planetary gear 22 revolves while rotating about its axis. Second ring gear 23 rotates.

Third carrier 34 rotates integrally with second ring gear 23. Each third planetary gear 32 revolves while rotating about its axis. Third sun gear 31 rotates.

Fourth sun gear 41 rotates integrally with third sun gear 31. Fourth ring gear 43 is not rotatable. The rotation of fourth sun gear 41 causes each fourth planetary gear 42 to revolve while rotating about its axis. As a result, fourth carrier 44 rotates integrally with third ring gear 33, and fourth carrier 44 outputs power having a changed rotational speed.

As shown in FIG. 2, when the speed position of planetary gear type transmission 100 is set to the sixth forward speed (F6), first clutch 51 and second clutch 52 are turned on, and first brake 61 is turned on. During the switching between the fifth speed (F5) and the sixth speed (F6), second clutch 52 and first brake 61 remain on. Third clutch 53, second brake 62 and third brake 63 are off.

Since first clutch 51 is turned on, first ring gear 13, second sun gear 21, third sun gear 31 and fourth sun gear 41 rotate integrally with one another. Since second clutch 52 is turned on, first carrier 14 rotates integrally with second carrier 24. Since first brake 61 is turned on, first sun gear 11 is rendered unrotatable.

Figure 9:
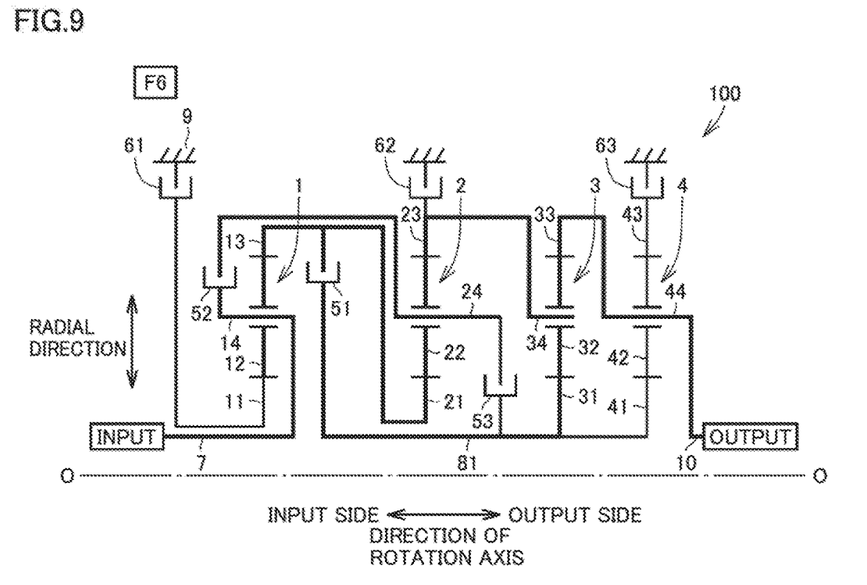
FIG. 9 is a diagram showing transmission of power when the planetary gear type transmission according to one embodiment is in the sixth forward speed position.

In this state, planetary gear type transmission 100 transmits power through a path such as indicated by a thick line in FIG. 9. First, first carrier 14 rotates integrally with input shaft 7. Each first planetary gear 12 revolves while rotating about its axis. First ring gear 13 rotates.

Second sun gear 21 rotates integrally with first ring gear 13. Second carrier 24 rotates integrally with first carrier 14. Each second planetary gear 22 revolves while rotating about its axis. Second ring gear 23 rotates.

Third sun gear 31 rotates integrally with first ring gear 13. Third carrier 34 rotates integrally with second ring gear 23. Each third planetary gear 32 revolves while rotating about its axis. Third ring gear 33 rotates.

Fourth carrier 44 rotates integrally with third ring gear 33. Fourth carrier 44 outputs power having a changed rotational speed.

As shown in FIG. 2, when the speed position of planetary gear type transmission 100 is set to the seventh forward speed (F7), second clutch 52 and third clutch 53 are turned on, and first brake 61 is turned on. During the switching between the sixth speed (F6) and the seventh speed (F7), second clutch 52 and first brake 61 remain on. First clutch 51, second brake 62 and third brake 63 are off.

Since second clutch 52 is turned on, first carrier 14 rotates integrally with second carrier 24. Since third clutch 53 is turned on, first intermediate shaft 81 rotates integrally with second carrier 24. Since first brake 61 is turned on, first sun gear 11 is rendered unrotatable.

Figure 10:
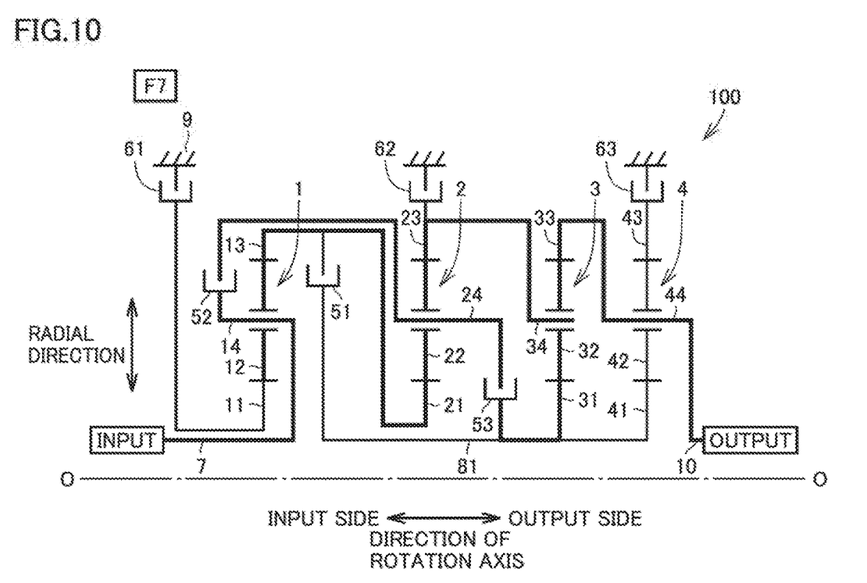
FIG. 10 is a diagram showing transmission of power when the planetary gear type transmission according to one embodiment is in the seventh forward speed position.

In this state, planetary gear type transmission 100 transmits power through a path such as indicated by a thick line in FIG. 10. First, first carrier 14 rotates integrally with input shaft 7. Each first planetary gear 12 revolves while rotating about its axis. First ring gear 13 rotates.

Second sun gear 21 rotates integrally with first ring gear 13. Second carrier 24 rotates integrally with first carrier 14. Each second planetary gear 22 revolves while rotating about its axis. Second ring gear 23 rotates.

Third sun gear 31 rotates integrally with second carrier 24. Third carrier 34 rotates integrally with second ring gear 23. Each third planetary gear 32 revolves while rotating about its axis. Third ring gear 33 rotates.

Fourth carrier 44 rotates integrally with third ring gear 33. Fourth carrier 44 outputs power having a changed rotational speed.

As shown in FIG. 2, when the speed position of planetary gear type transmission 100 is set to the eighth forward speed (F8), first clutch 51, second clutch 52 and third clutch 53 are turned on. During the switching between the seventh speed (F7) and the eighth speed (F8), second clutch 52 and third clutch 53 remain on. First brake 61, second brake 62 and third brake 63 are off.

Since first clutch 51 is turned on, first ring gear 13, second sun gear 21, third sun gear 31 and fourth sun gear 41 rotate integrally with one another. Since second clutch 52 is turned on, first carrier 14 rotates integrally with second carrier 24. Since third clutch 53 is turned on, first intermediate shaft 81 rotates integrally with second carrier 24.

Figure 11:
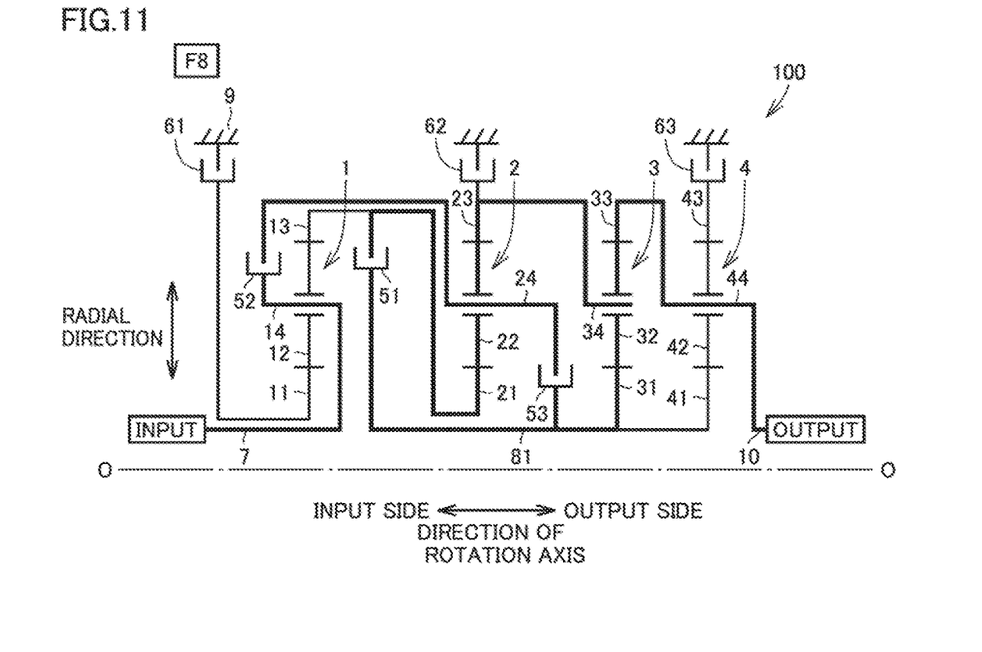
FIG. 11 is a diagram showing transmission of power when the planetary gear type transmission according to one embodiment is in the eighth forward speed position.

In this state, planetary gear type transmission 100 transmits power through a path such as indicated by a thick line in FIG. 11. First, first carrier 14 rotates integrally with input shaft 7. Second carrier 24 rotates integrally with first carrier 14. First intermediate shaft 81 rotates integrally with second carrier 24. Second sun gear 21 rotates integrally with first intermediate shaft 81. Thus, each second planetary gear 22 revolves without rotating about its axis. Second ring gear 23 rotates integrally with second sun gear 21 and second carrier 24.

Third sun gear 31 rotates integrally with first intermediate shaft 81. Third carrier 34 rotates integrally with second ring gear 23. Thus, each third planetary gear 32 revolves without rotating about its axis. Third ring gear 33 rotates integrally with third sun gear 31 and third carrier 34.

Fourth carrier 44 rotates integrally with third ring gear 33. As a result, fourth carrier 44 outputs power having an unchanged rotational speed. Planetary gear type transmission 100 at the eighth speed does not change the rotational speed of power from the engine or the like.

As shown in FIG. 2, when the speed position of planetary gear type transmission 100 is set to the ninth forward speed (F9), first clutch 51, third clutch 53 and first brake 61 are turned on. During the switching between the eighth speed (F8) and the ninth speed (F9), first clutch 51 and third clutch 53 remain on. Second clutch 52, second brake 62 and third brake 63 are off.

Since first clutch 51 is turned on, first ring gear 13, second sun gear 21, third sun gear 31 and fourth sun gear 41 rotate integrally with one another. Since third clutch 53 is turned on, first intermediate shaft 81 rotates integrally with second carrier 24. Since first brake 61 is turned on, first sun gear 11 is rendered unrotatable.

Figure 12:
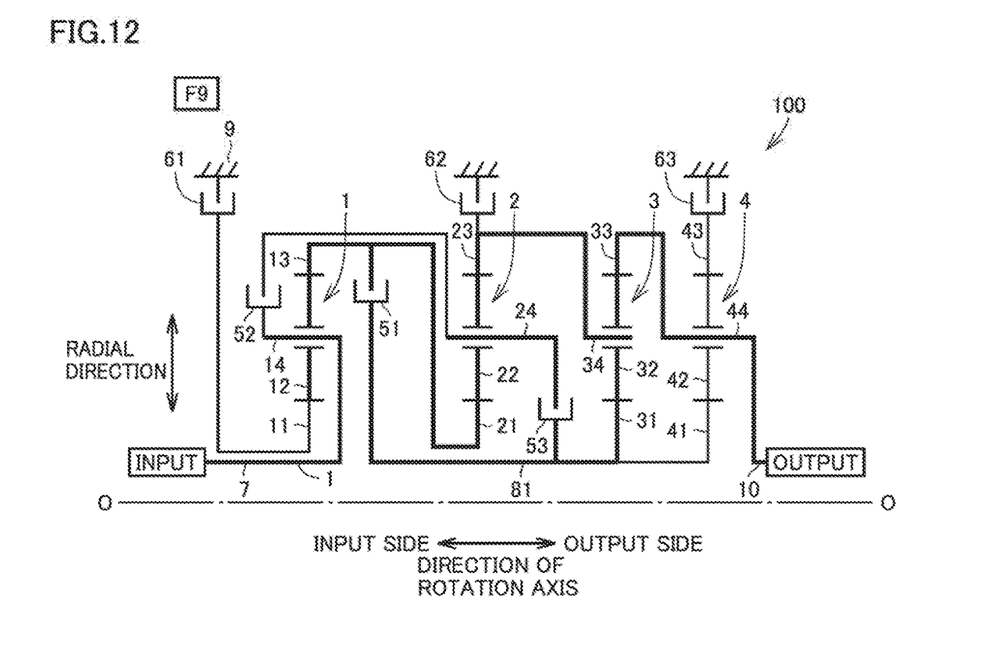
FIG. 12 is a diagram showing transmission of power when the planetary gear type transmission according to one embodiment is in the ninth forward speed position.

In this state, planetary gear type transmission 100 transmits power through a path such as indicated by a thick line in FIG. 12. First, first carrier 14 rotates integrally with input shaft 7. Each first planetary gear 12 revolves while rotating about its axis. First ring gear 13 rotates. First intermediate shaft 81 rotates integrally with first ring gear 13.

Second sun gear 21 rotates integrally with first ring gear 13. Second carrier 24 rotates integrally with first intermediate shaft 81. Second sun gear 21 and second carrier 24 rotate integrally with each other. Thus, each second planetary gear 22 revolves without rotating about its axis. Second ring gear 23 rotates integrally with second sun gear 21 and second carrier 24.

Third sun gear 31 rotates integrally with second carrier 24. Third carrier 34 rotates integrally with second ring gear 23. Thus, each third planetary gear 32 revolves without rotating about its axis. Third ring gear 33 rotates integrally with third sun gear 31 and third carrier 34.

Fourth carrier 44 rotates integrally with third ring gear 33. As a result, fourth carrier 44 outputs power having a changed rotational speed.

As shown in FIG. 2, when the speed position of planetary gear type transmission 100 is set to the first reverse speed (R1), third clutch 53 is turned on, and first brake 61 and second brake 62 are turned on. First clutch 51, second clutch 52 and third brake 63 are off.

Since third clutch 53 is turned on, first intermediate shaft 81 rotates integrally with second carrier 24. Since first brake 61 is turned on, first sun gear 11 is rendered unrotatable. Since second brake 62 is turned on, second ring gear 23 and third carrier 34 are rendered unrotatable.

Figure 13:
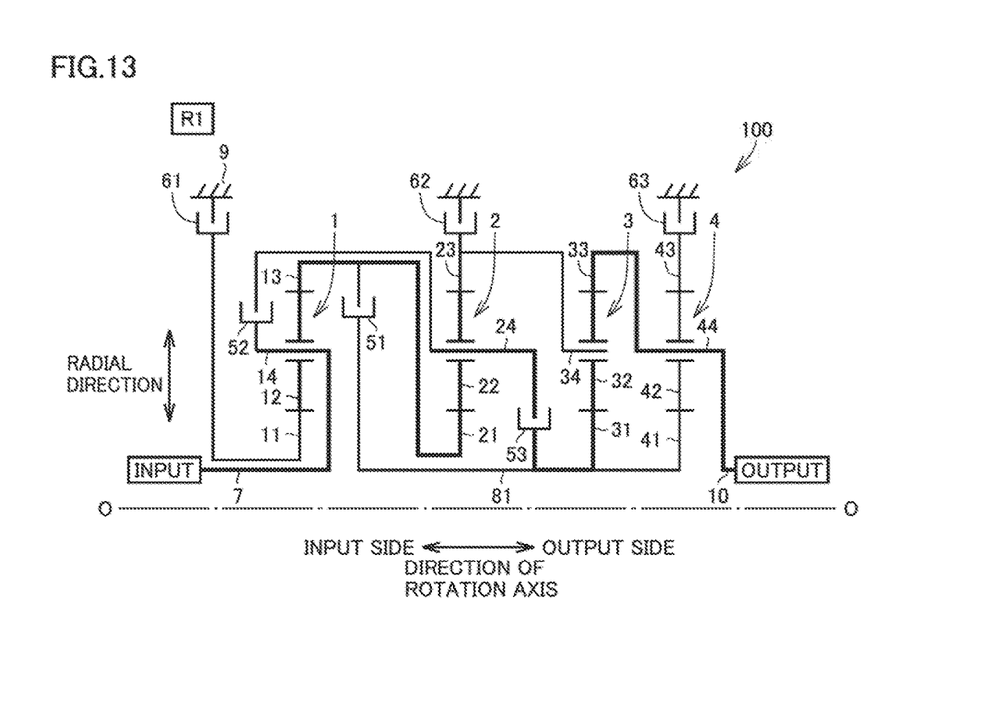
FIG. 13 is a diagram showing transmission of power when the planetary gear type transmission according to one embodiment is in the first reverse speed position.

In this state, planetary gear type transmission 100 transmits power through a path such as indicated by a thick line in FIG. 13. First, first carrier 14 rotates integrally with input shaft 7. Each first planetary gear 12 revolves while rotating about its axis. First ring gear 13 rotates.

Second sun gear 21 rotates integrally with first ring gear 13. The rotation of second sun gear 21 causes each second planetary gear 22 to revolve while rotating about its axis. Second carrier 24 rotates accordingly.

Third sun gear 31 rotates integrally with second carrier 24. The rotation of third sun gear 31 causes each third planetary gear 32 to rotate about its axis. Then, third ring gear 33 rotates. Since third carrier 34 is not rotatable, each third planetary gear 32 does not revolve.

Fourth carrier 44 rotates integrally with third ring gear 33. As a result, fourth carrier 44 outputs power having a changed rotational speed.

As shown in FIG. 2, when the speed position of planetary gear type transmission 100 is set to the second reverse speed (R2), first clutch 51 is turned on, and first brake 61 and second brake 62 are turned on. During the switching between the first speed (R1) and the second speed (R2), first brake 61 and second brake 62 remain on. Second clutch 52, third clutch 53 and third brake 63 are off.

Since first clutch 51 is turned on, first ring gear 13, second sun gear 21, third sun gear 31 and fourth sun gear 41 rotate integrally with one another. Since first brake 61 is turned on, first sun gear 11 is rendered unrotatable. Since second brake 62 is turned on, second ring gear 23 and third carrier 34 are rendered unrotatable.

Figure 14:
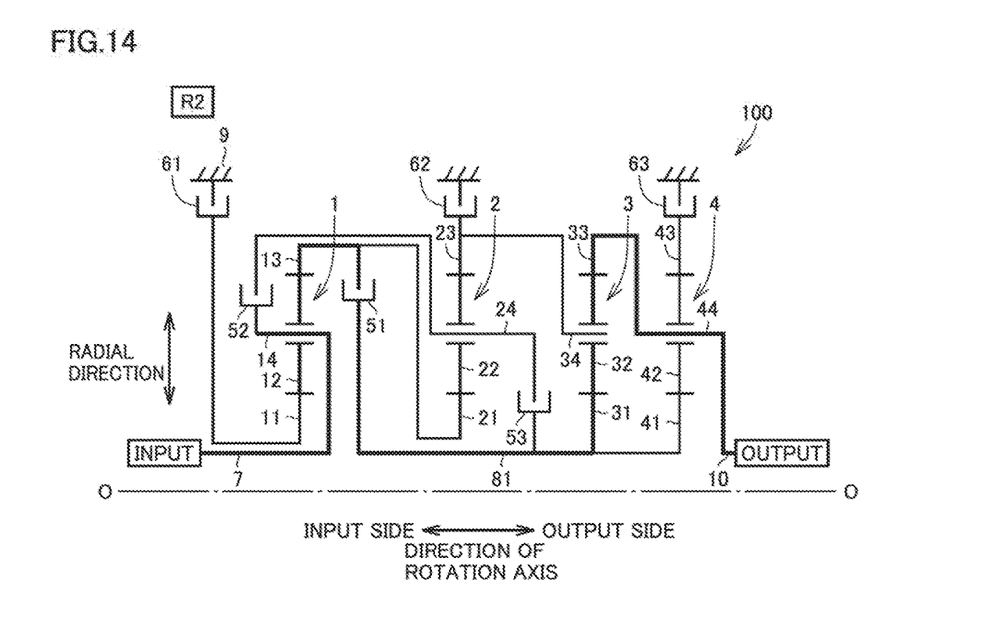
FIG. 14 is a diagram showing transmission of power when the planetary gear type transmission according to one embodiment is in the second reverse speed position.

In this state, planetary gear type transmission 100 transmits power through a path such as indicated by a thick line in FIG. 14. First, first carrier 14 rotates integrally with input shaft 7. Each first planetary gear 12 revolves while rotating about its axis. First ring gear 13 rotates. First intermediate shaft 81 rotates integrally with first ring gear 13.

Third sun gear 31 rotates integrally with first ring gear 13. The rotation of third sun gear 31 causes each third planetary gear 32 to rotate about its axis. Then, third ring gear 33 rotates. Since third carrier 34 is not rotatable, each third planetary gear 32 does not revolve.

Fourth carrier 44 rotates integrally with third ring gear 33. As a result, fourth carrier 44 outputs power having a changed rotational speed.

As shown in FIG. 2, when the speed position of planetary gear type transmission 100 is set to an alternative second reverse speed (R2'), second clutch 52 and third clutch 53 are turned on, and second brake 62 is turned on. First clutch 51, first brake 61 and third brake 63 are off.

Since second clutch 52 is turned on, first carrier 14 rotates integrally with second carrier 24. Since third clutch 53 is turned on, first intermediate shaft 81 rotates integrally with second carrier 24. Since second brake 62 is turned on, second ring gear 23 and third carrier 34 are rendered unrotatable.

Figure 15:
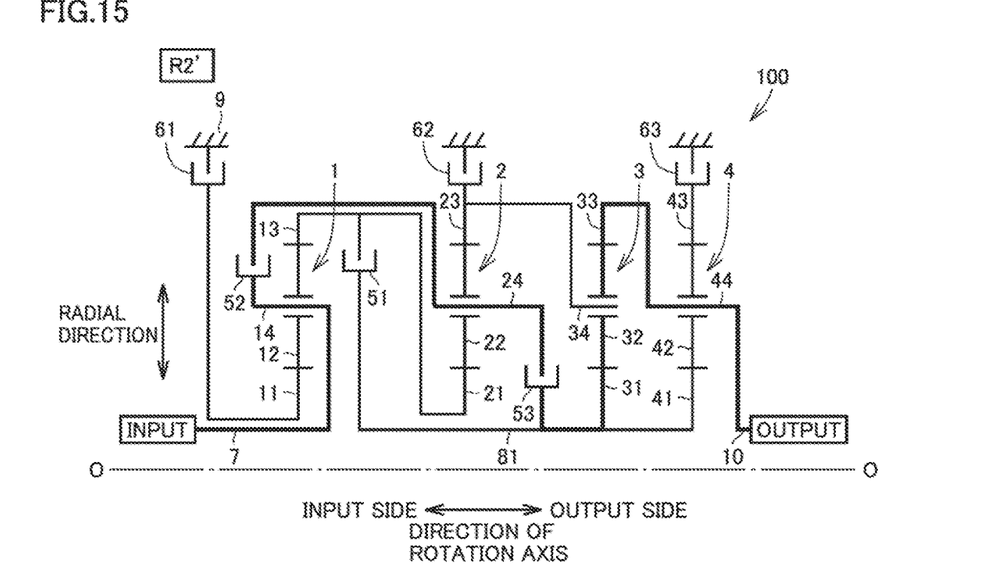
FIG. 15 is a diagram showing transmission of power when the planetary gear type transmission according to one embodiment is in an alternative second reverse speed position.

In this state, planetary gear type transmission 100 transmits power through a path such as indicated by a thick line in FIG. 15. First, first carrier 14 rotates integrally with input shaft 7. Second carrier 24 rotates integrally with first carrier 14. First intermediate shaft 81 rotates integrally with second carrier 24.

Third sun gear 31 rotates integrally with second carrier 24. The rotation of third sun gear 31 causes each third planetary gear 32 to rotate about its axis. Then, third ring gear 33 rotates. Since third carrier 34 is not rotatable, each third planetary gear 32 does not revolve.

Fourth carrier 44 rotates integrally with third ring gear 33. As a result, fourth carrier 44 outputs power having a changed rotational speed.

As shown in FIG. 2, when the speed position of planetary gear type transmission 100 is set to an alternative second reverse speed (R2"), first clutch 51 and second clutch 52 are turned on, and second brake 62 is turned on. Third clutch 53, first brake 61 and third brake 63 are off.

Since first clutch 51 is turned on, first ring gear 13, second sun gear 21, third sun gear 31 and fourth sun gear 41 rotate integrally with one another. Since second clutch 52 is turned on, first carrier 14 rotates integrally with second carrier 24. Since second brake 62 is turned on, second ring gear 23 and third carrier 34 are rendered unrotatable.

Figure 16:
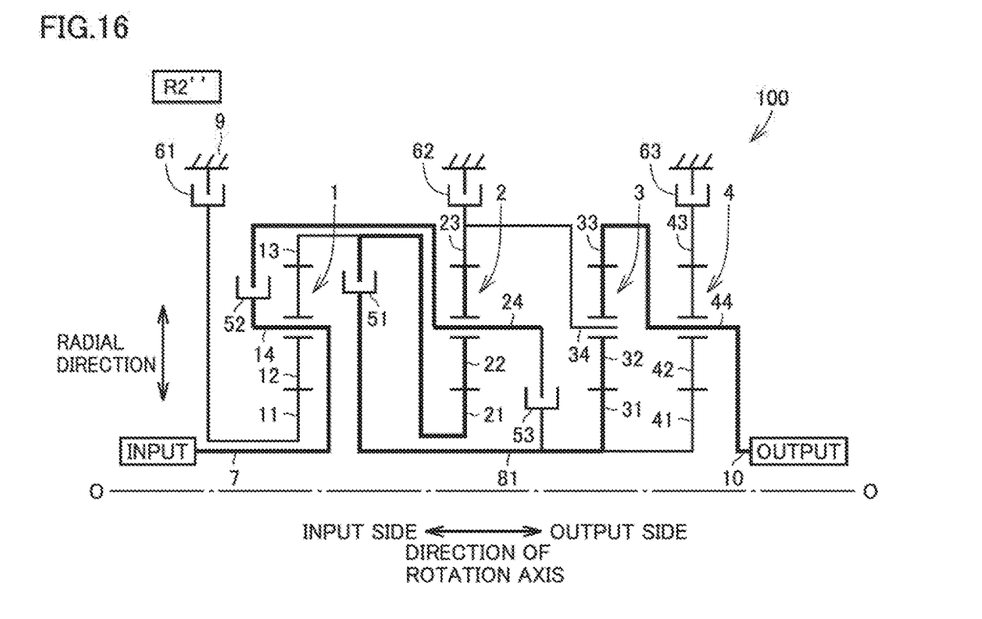
FIG. 16 is a diagram showing transmission of power when the planetary gear type transmission according to one embodiment is in an alternative second reverse speed position.

In this state, planetary gear type transmission 100 transmits power through a path such as indicated by a thick line in FIG. 16. First, first carrier 14 rotates integrally with input shaft 7. Second carrier 24 rotates integrally with first carrier 14. The rotation of second carrier 24 causes each second planetary gear 22 to revolve while rotating about its axis. Second sun gear 21 rotates. First intermediate shaft 81 rotates integrally with second sun gear 21.

Third sun gear 31 rotates integrally with first intermediate shaft 81. The rotation of third sun gear 31 causes each third planetary gear 32 to rotate about its axis. Then, third ring gear 33 rotates. Since third carrier 34 is not rotatable, each third planetary gear 32 does not revolve.

Fourth carrier 44 rotates integrally with third ring gear 33. As a result, fourth carrier 44 outputs power having a changed rotational speed.

A method of determining a reduction gear ratio at each speed position discussed above is now described. A reduction gear ratio at each speed position is determined using at least one of first to fourth relational expressions below.

The first relational expression is an expression for first planetary gear mechanism 1, and is expressed as the following equation:

$$a_1 \cdot N_{a1} + b_1 \cdot N_{b1} = (a_1 + b_1) \cdot N_{c1}$$

Here, $a_1$ denotes the number of teeth of first sun gear 11, $b_1$ denotes the number of teeth of first ring gear 13, $N_{a1}$ denotes a rotational speed ratio of first sun gear 11, $N_{b1}$ denotes a rotational speed ratio of first ring gear 13, and $N_{c1}$ denotes a rotational speed ratio of first carrier 14. It is noted that the rotational speed ratio of each gear refers to a ratio of the rotational speed of each gear to the speed of input shaft 7.

The second relational expression is an expression for second planetary gear mechanism 2, and is expressed as the following equation:

$$a_2 \cdot N_{a2} + b_2 \cdot N_{b2} = (a_2 + b_2) \cdot N_{c2}$$

Here, $a_2$ denotes the number of teeth of second sun gear 21, $b_2$ denotes the number of teeth of second ring gear 23, $N_{a2}$ denotes a rotational speed ratio of second sun gear 21, $N_{b2}$ denotes a rotational speed ratio of second ring gear 23, and $N_{c2}$ denotes a rotational speed ratio of second carrier 24.

The third relational expression is an expression for third planetary gear mechanism 3, and is expressed as the following equation:

$$a_3 \cdot N_{a3} + b_3 \cdot N_{b3} = (a_3 + b_3) \cdot N_{c3}$$

Here, $a_3$ denotes the number of teeth of third sun gear 31, $b_3$ denotes the number of teeth of third ring gear 33, $N_{a3}$ denotes a rotational speed ratio of third sun gear 31, $N_{b3}$ denotes a rotational speed ratio of third ring gear 33, and $N_{c3}$ denotes a rotational speed ratio of third carrier 34.

The fourth relational expression is an expression for fourth planetary gear mechanism 4, and is expressed as the following equation:

$$a_4 \cdot N_{a4} + b_4 \cdot N_{b4} = (a_4 + b_4) \cdot N_{c4}$$

Here, $a_4$ denotes the number of teeth of fourth sun gear 41, $b_4$ denotes the number of teeth of fourth ring gear 43, $N_{a4}$ denotes a rotational speed ratio of fourth sun gear 41, $N_{b4}$ denotes a rotational speed ratio of fourth ring gear 43, and $N_{c4}$ denotes a rotational speed ratio of fourth carrier 44.

A method of determining a reduction gear ratio at the first forward speed is described. Rotational speed ratio $N_{b1}$ of first ring gear 13 in first planetary gear mechanism 1 is determined from the first relational expression. Since first sun gear 11 does not rotate, rotational speed ratio $N_{a1}$ of first sun gear 11 is 0. Since first carrier 14 rotates integrally with input shaft 7, rotational speed ratio $N_{c1}$ of first carrier 14 is 1.

Since second sun gear 21 rotates integrally with first ring gear 13, rotational speed ratio $N_{a2}$ of second sun gear 21 is the same as rotational speed ratio $N_{b1}$ of first ring gear 13. Since second carrier 24, third sun gear 31 and fourth sun gear 41 rotate integrally with first intermediate shaft 81, rotational speed ratio $N_{c2}$ of second carrier 24, rotational speed ratio $N_{a3}$ of third sun gear 31, and rotational speed ratio $N_{a4}$ of fourth sun gear 41 are equal to one another. Since second ring gear 23 rotates integrally with third carrier 34, rotational speed ratio $N_{b2}$ of second ring gear 23 is the same as rotational speed ratio $N_{c3}$ of third carrier 34. Since third ring gear 33 rotates integrally with fourth carrier 44, rotational speed ratio $N_{b3}$ of third ring gear 33 is the same as rotational speed ratio $N_{c4}$ of fourth carrier 44. Since fourth ring gear 43 does not rotate, rotational speed ratio $N_{b4}$ of fourth ring gear 43 is 0.

Figure 3:
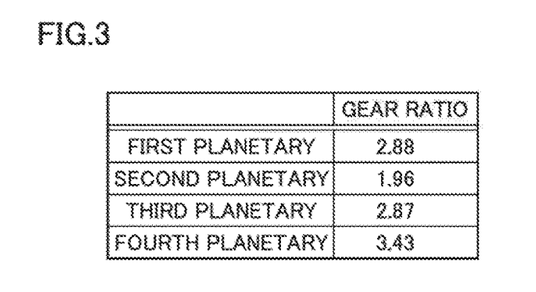
FIG. 3 is a table showing a gear ratio in each planetary gear mechanism of the planetary gear type transmission according to one embodiment.

By substituting the relation among these rotational speed ratios into the second to fourth relational expressions and solving a simultaneous linear equation with three unknowns of the second to fourth relational expressions, rotational speed ratio $N_{c4}$ of fourth carrier 44 is determined. The inverse of rotational speed ratio $N_{c4}$ of fourth carrier 44 serves as the reduction gear ratio of planetary gear type transmission 100. For example, when a ratio of the number of teeth of the ring gear to the number of teeth of the sun gear (gear ratio) in each of first to fourth planetary gear mechanisms 1 to 4 is as shown in FIG. 3, the reduction gear ratio at the first forward speed is about 6.98.

Likewise, a reduction gear ratio that was determined at each speed position is shown in FIG. 2. At the second forward speed, rotational speed ratio $N_{c4}$ of fourth carrier 44 is determined from the fourth relational expression. Since first carrier 14 rotates integrally with input shaft 7, second carrier 24 rotates integrally with first carrier 14, first intermediate shaft 81 rotates integrally with second carrier 24, and fourth sun gear 41 rotates integrally with first intermediate shaft 81, rotational speed ratio $N_{a4}$ of fourth sun gear 41 is 1. Since fourth ring gear 43 does not rotate, rotational speed ratio $N_{b4}$ of fourth ring gear 43 is 0. As a result, a reduction gear ratio at the second forward speed is determined. For example, when the gear ratio in each of first to fourth planetary gear mechanisms 1 to 4 is as shown in FIG. 3, the reduction gear ratio at the second forward speed is about 4.43.

At the third forward speed, rotational speed ratio $N_{b1}$ of first ring gear 13 is determined from the first relational expression. Rotational speed ratio $N_{a1}$ of first sun gear 11 is 0. Rotational speed ratio $N_{c1}$ of first carrier 14 is 1.

Then, rotational speed ratio $N_{c4}$ of fourth carrier 44 is determined from the fourth relational expression. Since first intermediate shaft 81 rotates integrally with first ring gear 13, and fourth ring gear 43 rotates integrally with first intermediate shaft 81, rotational speed ratio $N_{a4}$ of fourth sun gear 41 is the same as rotational speed ratio $N_{b1}$ of first ring gear 13. Rotational speed ratio $N_{b4}$ of fourth ring gear 43 is 0. As a result, a reduction gear ratio at the third forward speed is determined. For example, when the gear ratio in each of first to fourth planetary gear mechanisms 1 to 4 is as shown in FIG. 3, the reduction gear ratio at the third forward speed is about 3.29.

At the fourth forward speed, rotational speed ratio $N_{c2}$ of second carrier 24 is 1. Rotational speed ratio $N_{a2}$ of second sun gear 21, rotational speed ratio $N_{a3}$ of third sun gear 31, and rotational speed ratio $N_{a4}$ of fourth sun gear 41 are equal to one another. Rotational speed ratio $N_{b2}$ of second ring gear 23 is the same as rotational speed ratio $N_{c3}$ of third carrier 34. Rotational speed ratio $N_{b3}$ of third ring gear 33 is the same as rotational speed ratio $N_{c4}$ of fourth carrier 44. Rotational speed ratio $N_{b4}$ of fourth ring gear 43 is 0.

By substituting the relation among these rotational speed ratios into the second to fourth relational expressions and solving a simultaneous linear equation with three unknowns of the second to fourth relational expressions, rotational speed ratio $N_{c4}$ of fourth carrier 44 is determined. For example, when the gear ratio in each of first to fourth planetary gear mechanisms 1 to 4 is as shown in FIG. 3, the reduction gear ratio at the fourth forward speed is about 2.75.

At the fifth forward speed, rotational speed ratio $N_{b1}$ of first ring gear 13 is determined from the first relational expression. Rotational speed ratio $N_{a1}$ of first sun gear 11 is 0. Rotational speed ratio $N_{c1}$ of first carrier 14 is 1.

Then, rotational speed ratio $N_{b2}$ of second ring gear 23 is determined from the second relational expression. Rotational speed ratio $N_{a2}$ of second sun gear 21 is the same as rotational speed ratio $N_{b1}$ of first ring gear 13. Rotational speed ratio $N_{c2}$ of second carrier 24 is 1.

Then, rotational speed ratio $N_{c4}$ of fourth carrier 44 is determined from the third relational expression and the fourth relational expression. Rotational speed ratio $N_{a4}$ of fourth sun gear 41 is the same as rotational speed ratio $N_{a3}$ of third sun gear 31. Rotational speed ratio $N_{b2}$ of second ring gear 23 is the same as rotational speed ratio $N_{c3}$ of third carrier 34. Rotational speed ratio $N_{b3}$ of third ring gear 33 is the same as rotational speed ratio $N_{c4}$ of fourth carrier 44. Rotational speed ratio $N_{b4}$ of fourth ring gear 43 is 0. As a result, a reduction gear ratio at the fifth forward speed is determined. For example, when the gear ratio in each of first to fourth planetary gear mechanisms 1 to 4 is as shown in FIG. 3, the reduction gear ratio at the fifth forward speed is about 2.29.

At the sixth forward speed, rotational speed ratio $N_{b1}$ of first ring gear 13 is determined from the first relational expression. Rotational speed ratio $N_{a1}$ of first sun gear 11 is 0. Rotational speed ratio $N_{c1}$ of first carrier 14 is 1.

Then, rotational speed ratio $N_{b2}$ of second ring gear 23 is determined from the second relational expression. Rotational speed ratio $N_{a2}$ of second sun gear 21 is the same as rotational speed ratio $N_{b1}$ of first ring gear 13. Rotational speed ratio $N_{c2}$ of second carrier 24 is 1.

Then, rotational speed ratio $N_{b3}$ of third ring gear 33 is determined from the third relational expression. Rotational speed ratio $N_{a3}$ of third sun gear 31 is the same as rotational speed ratio $N_{b1}$ of first ring gear 13. Rotational speed ratio $N_{b2}$ of second ring gear 23 is the same as rotational speed ratio $N_{c3}$ of third carrier 34.

Rotational speed ratio $N_{b3}$ of third ring gear 33 is the same as rotational speed ratio $N_{c4}$ of fourth carrier 44. Thus, rotational speed ratio $N_{c4}$ of fourth carrier 44 is determined. As a result, a reduction gear ratio at the sixth forward speed is determined. For example, when the gear ratio in each of first to fourth planetary gear mechanisms 1 to 4 is as shown in FIG. 3, the reduction gear ratio at the sixth forward speed is about 1.56.

At the seventh forward speed, rotational speed ratio $N_{b1}$ of first ring gear 13 is determined from the first relational expression. Rotational speed ratio $N_{a1}$ of first sun gear 11 is 0. Rotational speed ratio $N_{c1}$ of first carrier 14 is 1.

Then, rotational speed ratio $N_{b2}$ of second ring gear 23 is determined from the second relational expression. Rotational speed ratio $N_{a2}$ of second sun gear 21 is the same as rotational speed ratio $N_{b1}$ of first ring gear 13. Rotational speed ratio $N_{c2}$ of second carrier 24 is 1.

Then, rotational speed ratio $N_{b3}$ of third ring gear 33 is determined from the third relational expression. Rotational speed ratio $N_{a3}$ of third sun gear 31 is 1. Rotational speed ratio $N_{b2}$ of second ring gear 23 is the same as rotational speed ratio $N_{c3}$ of third carrier 34.

Rotational speed ratio $N_{b3}$ of third ring gear 33 is the same as rotational speed ratio $N_{c4}$ of fourth carrier 44. Thus, rotational speed ratio $N_{c4}$ of fourth carrier 44 is determined. As a result, a reduction gear ratio at the seventh forward speed is determined. For example, when the gear ratio in each of first to fourth planetary gear mechanisms 1 to 4 is as shown in FIG. 3, the reduction gear ratio at the seventh forward speed is about 1.32.

At the eighth forward speed, speed change is not performed as described above. A reduction gear ratio at the eighth forward speed is 1.

At the ninth forward speed, rotational speed ratio $N_{b1}$ of first ring gear 13 is determined from the first relational expression. Rotational speed ratio $N_{a1}$ of first sun gear 11 is 0. Rotational speed ratio $N_{c1}$ of first carrier 14 is 1.

Rotational speed ratio $N_{b1}$ of first ring gear 13, rotational speed ratio $N_{a2}$ of second sun gear 21, rotational speed ratio $N_{c2}$ of second carrier 24, and rotational speed ratio $N_{a3}$ of third sun gear 31 are equal to one another. Rotational speed ratio $N_{b2}$ of second ring gear 23 is the same as rotational speed ratio $N_{c3}$ of third carrier 34. Thus, rotational speed ratio $N_{b3}$ of third ring gear 33 is the same as rotational speed ratio $N_{b1}$ of first ring gear 13.

Rotational speed ratio $N_{b3}$ of third ring gear 33 is the same as rotational speed ratio $N_{c4}$ of fourth carrier 44. Thus, rotational speed ratio $N_{c4}$ of fourth carrier 44 is determined. For example, when the gear ratio in each of first to fourth planetary gear mechanisms 1 to 4 is as shown in FIG. 3, the reduction gear ratio at the ninth forward speed is about 0.74.

At the first reverse speed, rotational speed ratio $N_{b1}$ of first ring gear 13 is determined from the first relational expression. Rotational speed ratio $N_{a1}$ of first sun gear 11 is 0. Rotational speed ratio $N_{c1}$ of first carrier 14 is 1.

Then, rotational speed ratio $N_{c2}$ of second carrier 24 is determined from the second relational expression. Rotational speed ratio $N_{a2}$ of second sun gear 21 is the same as rotational speed ratio $N_{b1}$ of first ring gear 13. Rotational speed ratio $N_{b2}$ of second ring gear 23 is 0.

Then, rotational speed ratio $N_{b3}$ of third ring gear 33 is determined from the third relational expression. Rotational speed ratio $N_{a3}$ of third sun gear 31 is the same as rotational speed ratio $N_{c2}$ of second carrier 24. Rotational speed ratio $N_{c3}$ of third carrier 34 is 0.

Rotational speed ratio $N_{b3}$ of third ring gear 33 is the same as rotational speed ratio $N_{c4}$ of fourth carrier 44. Thus, rotational speed ratio $N_{c4}$ of fourth carrier 44 is determined. For example, when the gear ratio in each of first to fourth planetary gear mechanisms 1 to 4 is as shown in FIG. 3, the reduction gear ratio at the first reverse speed is about −6.30.

At the second reverse speed, rotational speed ratio $N_{b1}$ of first ring gear 13 is determined from the first relational expression. Rotational speed ratio $N_{a1}$ of first sun gear 11 is 0. Rotational speed ratio $N_{c1}$ of first carrier 14 is 1.

Then, rotational speed ratio $N_{b3}$ of third ring gear 33 is determined from the third relational expression. Rotational speed ratio $N_{a3}$ of third sun gear 31 is the same as rotational speed ratio $N_{b1}$ of first ring gear 13. Rotational speed ratio $N_{c3}$ of third carrier 34 is 0.

Rotational speed ratio $N_{b3}$ of third ring gear 33 is the same as rotational speed ratio $N_{c4}$ of fourth carrier 44. Thus, rotational speed ratio $N_{c4}$ of fourth carrier 44 is determined. For example, when the gear ratio in each of first to fourth planetary gear mechanisms 1 to 4 is as shown in FIG. 3, the reduction gear ratio at the second reverse speed is about −2.13.

At the alternative second reverse speed (R2'), rotational speed ratio $N_{b3}$ of third ring gear 33 is determined from the third relational expression. Since first carrier 14 rotates integrally with input shaft 7, second carrier 24 rotates integrally with first carrier 14, first intermediate shaft 81 rotates integrally with second carrier 24, and third sun gear 31 rotates integrally with first intermediate shaft 81, rotational speed ratio $N_{a3}$ of third sun gear 31 is 1. Rotational speed ratio $N_{c3}$ of third carrier 34 is 0.

Rotational speed ratio $N_{b3}$ of third ring gear 33 is the same as rotational speed ratio $N_{c4}$ of fourth carrier 44. Thus, rotational speed ratio $N_{c4}$ of fourth carrier 44 is determined. For example, when the gear ratio in each of first to fourth planetary gear mechanisms 1 to 4 is as shown in FIG. 3, the reduction gear ratio at the alternative second reverse speed (R2') is about −2.87.

At the alternative second reverse speed (R2"), rotational speed ratio $N_{a2}$ of second sun gear 21 is determined from the second relational expression. Since first carrier 14 rotates integrally with input shaft 7, and second carrier 24 rotates integrally with first carrier 14, rotational speed ratio $N_{c2}$ of second carrier 24 is 1. Rotational speed ratio $N_{b2}$ of second ring gear 23 is 0.

Then, rotational speed ratio $N_{b3}$ of third ring gear 33 is determined from the third relational expression. Since first intermediate shaft 81 rotates integrally with second sun gear 21, and third sun gear 31 rotates integrally with first intermediate shaft 81, rotational speed ratio $N_{a3}$ of third sun gear 31 is the same as rotational speed ratio $N_{c2}$ of second sun gear 21. Rotational speed ratio $N_{c3}$ of third carrier 34 is 0.

Rotational speed ratio $N_{b3}$ of third ring gear 33 is the same as rotational speed ratio $N_{c4}$ of fourth carrier 44. Thus, rotational speed ratio $N_{c4}$ of fourth carrier 44 is determined. For example, when the gear ratio in each of first to fourth planetary gear mechanisms 1 to 4 is as shown in FIG. 3, the reduction gear ratio at the alternative second reverse speed (R2") is about −0.97.

It is noted that a step ratio shown in FIG. 2 represents a ratio between the reduction gear ratios of the respective speed positions. More specifically, the step ratio refers to a value obtained by, with regard to the reduction gear ratios of the speed positions adjacent to each other, dividing the reduction gear ratio of the lower speed position by the reduction gear ratio of the higher speed position. An overall step ratio refers to a value obtained by dividing the reduction gear ratio of the lowest speed position by the reduction gear ratio of the highest speed position. Planetary gear type transmission 100 of this embodiment has nine forward speed positions. The overall step ratio of planetary gear type transmission 100 of this embodiment is a value obtained by dividing the reduction gear ratio at the first forward speed by the reduction gear ratio at the ninth forward speed.

Planetary gear type transmission 100 of this embodiment has nine forward speed positions and two reverse speed positions, which means an increased number of speed positions of planetary gear type transmission 100. In order to realize the speed positions including nine forward speed positions and two reverse speed positions, planetary gear type transmission 100 has the four planetary gear mechanisms and the total of six clutches and brakes, which means a reduced number of components. The overall step ratio shown in FIG. 2 is 9.40, which means an increased overall step ratio. The step ratios among the nine forward speed positions are within the range from 1.19 to 1.58, which means a reduced variation in step ratios.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 first planetary gear mechanism; 2 second planetary gear mechanism; 3 third planetary gear mechanism; 4 fourth planetary gear mechanism; 7 input shaft; 9 casing; 10 output shaft; 11 first sun gear; 12 first planetary gear; 13 first ring gear; 14 first carrier; 21 second sun gear; 22 second planetary gear; 23 second ring gear; 24 second carrier; 31 third sun gear; 32 third planetary gear; 33 third ring gear; 34 third carrier; 41 fourth sun gear; 42 fourth planetary gear; 43 fourth ring gear; 44 fourth carrier; 51 first clutch; 52 second clutch; 53 third clutch; 61 first brake; 62 second brake; 63 third brake; 81 first intermediate shaft; 100 planetary gear type transmission.

The invention claimed is:

1. A planetary gear type transmission comprising:
   an input shaft configured to rotate around a rotation axis;
   a first intermediate shaft configured to rotate around the rotation axis;
   a first planetary gear mechanism having a first sun gear, a first planetary gear, a first ring gear, and a first carrier configured to rotate integrally with the input shaft;
   a second planetary gear mechanism having a second sun gear configured to rotate integrally with the first ring gear, a second planetary gear, a second ring gear, and a second carrier;
   a third planetary gear mechanism having a third sun gear configured to rotate integrally with the first intermediate shaft, a third planetary gear, a third ring gear, and a third carrier configured to rotate integrally with the second ring gear;
   a fourth planetary gear mechanism having a fourth sun gear configured to rotate integrally with the first intermediate shaft, a fourth planetary gear, a fourth ring gear, and a fourth carrier configured to rotate integrally with the third ring gear and to output power;
   a first clutch configured to couple the first ring gear and the second sun gear to the first intermediate shaft;
   a second clutch configured to couple the first carrier to the second carrier;
   a third clutch configured to couple the second carrier to the first intermediate shaft;
   a first brake configured to brake rotation of the first sun gear;
   a second brake configured to brake rotation of the second ring gear and the third carrier; and
   a third brake configured to brake rotation of the fourth ring gear.

2. The planetary gear type transmission according to claim 1, further comprising an output shaft configured to rotate integrally with the fourth carrier.

3. The planetary gear type transmission according to claim 1, wherein
   the first planetary gear mechanism, the second planetary gear mechanism, the third planetary gear mechanism, and the fourth planetary gear mechanism are disposed in this order along a direction of rotation axis.

* * * * *